(12) United States Patent
Carringer et al.

(10) Patent No.: US 8,601,050 B2
(45) Date of Patent: Dec. 3, 2013

(54) SYSTEM AND METHOD FOR GENERATING A MODIFIED WEB PAGE BY INLINE CODE INSERTION IN RESPONSE TO AN INFORMATION REQUEST FROM A CLIENT COMPUTER

(76) Inventors: Michael Carringer, Knoxville, TN (US); Mark Schmid, Midlothian, VA (US)

(*) Notice: Subject to any disclaimer, the term of this patent is extended or adjusted under 35 U.S.C. 154(b) by 1152 days.

(21) Appl. No.: 11/863,105

(22) Filed: Sep. 27, 2007

(65) Prior Publication Data

US 2008/0016153 A1 Jan. 17, 2008

Related U.S. Application Data

(63) Continuation of application No. 10/189,351, filed on Jul. 2, 2002, which is a continuation-in-part of application No. 09/366,530, filed on Aug. 2, 1999, now Pat. No. 6,438,578, which is a continuation-in-part of application No. 09/096,916, filed on Jun. 12, 1998, now abandoned, which is a continuation of application No. 08/667,183, filed on Jun. 12, 1996, now abandoned.

(51) Int. Cl.
*G06F 15/16* (2006.01)

(52) U.S. Cl.
USPC ........... 709/203; 709/217; 709/218; 709/219; 725/10; 705/10

(58) Field of Classification Search
USPC .......................................................... 709/203
See application file for complete search history.

(56) References Cited

U.S. PATENT DOCUMENTS

| | | |
|---|---|---|
| 4,648,037 A | 3/1987 | Valentino |
| 4,833,308 A | 5/1989 | Humble |
| 4,850,007 A | 7/1989 | Marino et al. |
| 4,920,488 A | 4/1990 | Filley |
| 4,972,318 A | 11/1990 | Brown et al. |
| 5,031,119 A | 7/1991 | Dulaney et al. |
| 5,088,586 A | 2/1992 | Isobe et al. |
| 5,105,184 A | 4/1992 | Pirani et al. |
| 5,115,504 A | 5/1992 | Belove et al. |
| 5,220,501 A | 6/1993 | Lawlor et al. |

(Continued)

FOREIGN PATENT DOCUMENTS

WO   WO0237828 A2   5/2002

OTHER PUBLICATIONS

Resnik, R., "Eye Catchers," *Internet World*, p. 32, (Jun. 1996).

(Continued)

*Primary Examiner* — Tauqir Hussain
(74) *Attorney, Agent, or Firm* — Hamilton, Brook, Smith & Reynolds, P.C.

(57) ABSTRACT

Information requested by a client is intercepted by a network server, which sends the request to the requested information source. The requested information is received and examined by the server to determine if the information is HTML format. If so, the server modifies the requested information by inserting format and request instructions then sends same to the client computer. The client uses the format and request instructions to send a request for supplemental information from a supplemental information source. The associated supplemental information is sent from the supplemental information source to the network client. The format instructions cause the requested information and supplemental information to be displayed in respective first and second display areas.

38 Claims, 3 Drawing Sheets

(56) References Cited

U.S. PATENT DOCUMENTS

| | | |
|---|---|---|
| 5,237,157 A | 8/1993 | Kaplan |
| 5,283,731 A | 2/1994 | Lalonde et al. |
| 5,295,064 A | 3/1994 | Malec et al. |
| 5,297,249 A | 3/1994 | Bernstein et al. |
| 5,305,195 A | 4/1994 | Murphy |
| 5,347,632 A | 9/1994 | Filepp et al. |
| 5,367,627 A | 11/1994 | Johnson |
| 5,511,160 A | 4/1996 | Robson |
| 5,515,490 A | 5/1996 | Buchanan et al. |
| 5,572,643 A | 11/1996 | Judson |
| 5,701,451 A | 12/1997 | Rogers et al. |
| 5,710,884 A * | 1/1998 | Dedrick .................. 709/217 |
| 5,717,923 A | 2/1998 | Dedrick |
| 5,724,521 A | 3/1998 | Dedrick |
| 5,740,549 A * | 4/1998 | Reilly et al. ............... 705/14.42 |
| 5,809,242 A | 9/1998 | Shaw et al. |
| 5,819,034 A | 10/1998 | Joseph et al. |
| 5,848,396 A * | 12/1998 | Gerace ........................ 705/10 |
| 5,901,287 A * | 5/1999 | Bull et al. ................. 709/218 |
| 5,913,040 A | 6/1999 | Rakavy et al. |
| 5,933,811 A * | 8/1999 | Angles et al. ............. 705/14.56 |
| 5,948,061 A * | 9/1999 | Merriman et al. ........... 709/219 |
| 5,959,623 A * | 9/1999 | van Hoff et al. ............. 715/719 |
| 5,974,451 A | 10/1999 | Simmons |
| 6,055,510 A | 4/2000 | Henrick et al. |
| 6,101,537 A | 8/2000 | Edelstein et al. |
| 6,141,010 A | 10/2000 | Hoyle |
| 6,189,000 B1 | 2/2001 | Gwertzman et al. |
| 6,192,414 B1 | 2/2001 | Horn |
| 6,240,555 B1 * | 5/2001 | Shoff et al. ................. 725/110 |
| 6,256,739 B1 | 7/2001 | Skopp et al. |
| 6,298,330 B1 | 10/2001 | Gardenswartz et al. |
| 6,311,185 B1 | 10/2001 | Markowitz et al. |
| 6,314,451 B1 | 11/2001 | Landsman et al. |
| 6,339,761 B1 | 1/2002 | Cottingham |
| 6,438,578 B1 | 8/2002 | Schmid et al. |
| 6,438,580 B1 | 8/2002 | Mears et al. |
| 6,473,802 B2 | 10/2002 | Masters |
| 6,480,883 B1 | 11/2002 | Tsutsumitake |
| 6,487,538 B1 | 11/2002 | Gupta et al. |
| 6,604,144 B1 | 8/2003 | Anders |
| 6,665,838 B1 | 12/2003 | Brown et al. |
| 6,826,594 B1 | 11/2004 | Pettersen |
| 6,877,007 B1 | 4/2005 | Hentzel et al. |
| 6,886,013 B1 | 4/2005 | Beranek |
| 6,892,226 B1 | 5/2005 | Tso et al. |
| 7,146,505 B1 | 12/2006 | Harada et al. |
| 2002/0067730 A1 | 6/2002 | Hinderks et al. |
| 2002/0124172 A1 | 9/2002 | Manahan |
| 2003/0009559 A1 | 1/2003 | Ikeda |
| 2003/0018966 A1 | 1/2003 | Cook et al. |
| 2003/0025832 A1 | 2/2003 | Swart et al. |
| 2003/0149567 A1 | 8/2003 | Schmitz et al. |
| 2004/0015608 A1 | 1/2004 | Ellis et al. |
| 2004/0049598 A1 | 3/2004 | Tucker et al. |

OTHER PUBLICATIONS

Clark, D., "Microsoft Taps into Local Media's Turf," *Wall Street Journal*, (Apr. 1996).

Carl, J., "Ads Let Hyper Net Give Away Web Access," *Web Week*, p. 8 (Jun. 3, 1996).

Hyper Net Internet web site, [retrieved on Jun. 11, 1996]. Retrieved from the internet URL: www.hypernet.com.jp.

Tritium Network web site, [retrieved on Dec. 28, 1998]. Retrieved from the internet URL: www.tritium.net.

Netzero web site, [retrieved on Jun. 29, 1999]. Retrieved from the internet URL: www.netzero.com.

* cited by examiner

SYSTEM AND METHOD FOR GENERATING A MODIFIED WEB PAGE BY INLINE CODE INSERTION IN RESPONSE TO AN INFORMATION REQUEST FROM A CLIENT COMPUTER

RELATED APPLICATIONS

This application is a continuation of U.S. patent application Ser. No. 10/189,351, filed Jul. 2, 2002, to which priority of filing date is hereby claimed and which is hereby incorporated in its entirety by reference, and which is itself a continuation-in-part of U.S. patent application Ser. No. 09/366,530, filed Aug. 2, 1999, to which priority of filing date is hereby claimed and which is hereby incorporated in its entirety by reference, and further which is itself a continuation-in-part of U.S. patent application Ser. No. 09/096,916, filed Jun. 12, 1998, to which priority of filing date is hereby claimed and which is hereby incorporated in its entirety by reference, and still further which is itself a continuation of U.S. patent application Ser. No. 08/667,183, filed Jun. 12, 1996, to which priority of filing date is hereby claimed and which is hereby incorporated in its entirety by reference.

By way of the aforementioned incorporation by reference, this application contains a computer program listing. Therefore, a portion of the disclosure of this patent document, including all of the computer source code, contains material that is subject to copyright protection. The copyright owner has no objection to the facsimile reproduction by anyone of the patent document as it appears in the Patent and Trademark office patent file or records, but otherwise reserves all copyright rights whatsoever.

BACKGROUND OF THE INVENTION

This invention pertains generally to the communication of information between computers connected to a computer network. More particularly, this invention relates to systems and methods for sending, receiving, and responding to requests for information, including requests for web pages, between and among computers linked to a computer network, and further including methods of generating a modified version of a requested web page.

Millions of computers are permanently or temporarily connected together in a worldwide computer network, sometimes referred to as the "world wide web." On this network, information is exchanged between and among computers when a network client computer, using a software application known as a web "browser", sends a request for information stored on a network server computer. The server receives and processes the request and, conventionally, responds by sending one or more web "pages" containing the requested information to the client computer. The web pages and information are then displayed by the browser to the user of the client computer. This same method of information exchange can also occur on a private network (sometimes referred to as an "intranet") that uses the same communications protocols as are conventionally employed on the World Wide Web.

Frequently, in responding to various types of information requests from selected network client computers, there is a need to supply a modified web page to the requester. The modifications may include commercial advertising messages, supplemental information related to the information that is requested, or even modifications to the appearance of the browser in which the web pages are being displayed. Typically, modifications to requested web pages are made by modifying the computer software source code instructions such as HyperText Markup Language ("HTML") which are sent to the client computer by the server and then used by the client browser to generate and display the page.

One example of a conventional method of modifying a requested web page is taught in U.S. Pat. No. 5,974,453 issued to Simmons, in which supplemental information (or "bulletin" as described by Simmons) is attached to the requested information by a "Network Access System" before it is relayed to the "External Computer". In this approach, the "bulletin" can be hyperlinked to the requested information, packaged to display sequentially with the requested information, or simply attached as a bitmap or text file. Any integration of information that occurs in the method and system taught by Simmons takes place in the server before it is sent to the client computer. Thus, Simmons uses a more conventional "per page" information handling technique which requires caching of an entire page in the server, attaching the bulletin to the cached page, and sending the modified page to the network client. The network client then uses the modified page as sent by the server.

Similarly, in U.S. Pat. No. 6,189,000 issued to Gwertzman, content sent to a client computer in response to a request is customized by an application running in the server before it is sent to the client computer.

What is needed in addition is a system that can modify web pages via inline insertion of format and request instructions into a stream of requested information in response to a first request from a client computer, which format and request instructions generate a request for supplemental information and cause the requested information and supplemental information to be displayed together in a single browser window or in separate browser windows, with all inspection, processing, and transmission of requested information handled on a per packet basis.

SUMMARY OF THE INVENTION

The above and other needs are met by a method of accessing information through a network server from information sources in a computer communication network. The method routes the information through the network server to a network client. A request for requested information from a requested information source is sent using the network client. The request is intercepted by the network server, which sends the request to the requested information source. The requested information is received from the requested information source, using the network server. The network server examines the requested information to determine if the information is HyperText Markup Language (HTML). If the requested information is not HTML, the requested information is sent to the network client without modification. If the requested information is HTML, the network server modifies the requested information by inserting format and request instructions into the requested information and then sending the modified requested information containing the format and request instructions to the client computer. The client computer uses the format and request instructions to send a request for supplemental information. The request for supplemental information is intercepted and forwarded to a supplemental information source, and the associated supplemental information is received by the network server from the supplemental information source and sent to the network client.

Thus, in the method according to the invention, the network server sends format and request instructions to the network client in response to the first request, the format and request instructions being inserted directly into the requested information. The format and request instructions cause the network client to send a request for supplemental information, and cause the requested information and the supplemental information to be displayed together in a manner specified by the format instructions.

In various preferred embodiments, the request for supplemental information generated by the format and request instructions contains information such as the identities of the network client and the requested information source, which can be used by the supplemental information source to deliver individualized or targeted supplemental information selected according to the identity of the network client or associated with the requested information source. Various methods exist for selecting and delivering individualized and targeted content in this manner, including, but not limited to, the methods specified in the co-pending patent application.

The manner of displaying the requested information and the supplemental information can take several forms including displaying the supplemental information in an inline frame or inline layer along with the requested information in a single browser window on the network client computer, or by displaying the supplemental information in a separate browser window positioned adjacent to a browser window containing the requested information.

An important feature of this invention is the ability of the network server to receive only the initial packets of the requested information into a memory (rather than the entire web page, which is typically composed of a multiplicity of packets), to examine the initial packets to determine if the requested information is HTML, to insert the format and request instructions into the initial packets, and to send the packets of modified requested information to the client computer on a per packet basis. The unmodified portion of the requested information is then received by the network server and sent directly to the client computer on a per packet basis. Likewise, if it is determined that the requested information is not HTML, the requested information is sent to the client computer without modification, again on a per packet basis.

A network server according to the present invention accesses information from information sources in a computer communication network, and routes the information to a network client. Interception means receive from the network client a request for requested information from a requested information source. Communication monitoring means inspect the request and, in the preferred embodiment, determine whether the request includes a tag. In the case where the request does not include the tag, a transmission means sends the request to the requested information source, and the interception means receives the first portion of the requested information into a memory. The communication monitoring means examines the requested information to determine if the requested information is HTML. If the requested information is HTML, the transmission means inserts format and request instructions into the first portion of the requested information, then sends the modified requested information to the network client.

The format and request instructions sent to the network client cause the network client to send requests for the supplemental information. In the preferred embodiment, the format and request instructions cause the requests for supplemental information to contain a tag. The interception means receives the requests for supplemental information. The communication monitoring means inspects the request and determines whether the request includes the tag. If the request includes the tag, the transmission means request the associated supplemental information. Interception means receive the associated supplemental information, and the transmission means sends the associated supplemental information to the network client in response to the request for the associated supplemental information from the network client.

DETAILED DESCRIPTION OF THE INVENTION

Figure 1:
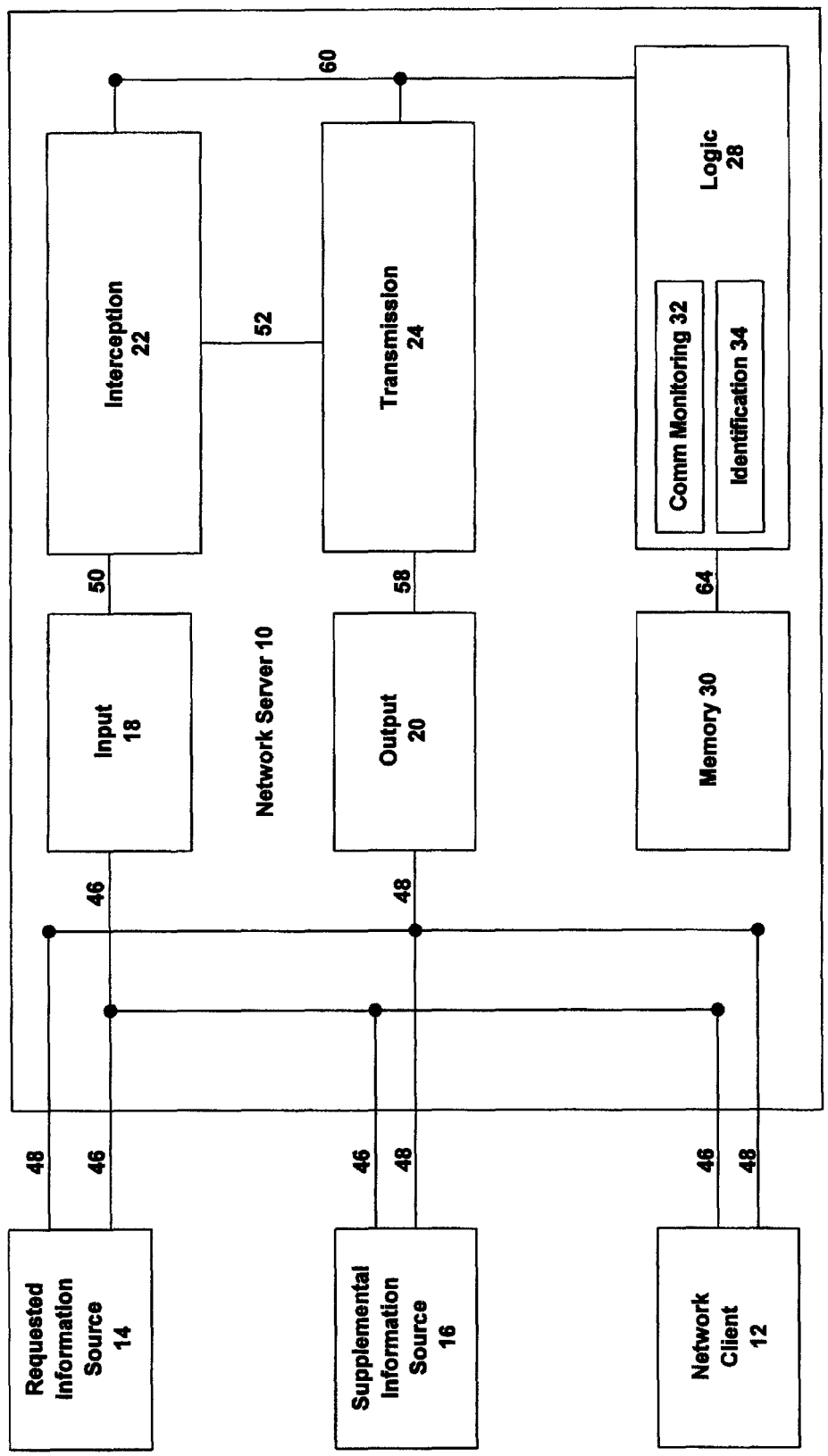
FIG. 1 is a functional block diagram of one embodiment of the invention.

Referring now to FIG. 1, there is depicted a functional block diagram of a network server 10 that functions as a code insertion system. It will be appreciated that FIG. 1 does not depict the physical aspects of the code insertion system, but depicts instead how the elements function. A physical description of the system will be provided in greater detail below.

A network client 12 is connected to the network server 10 by input lines 46 and output lines 48. All of the lines 46 and 48 collectively comprise a communication network. In a preferred embodiment, the network client 12 is a stand-alone personal computer connected to the network server 10 through an interface device, such as a modem, and the input lines 46 and the output lines 48 connected to the network client 12 are a communication line such as ISDN, analog telephone, ADSL, T1, cable, or wireless. The network client 12 typically has the capacity to send and receive, but more often receives information from one or more of the other components connected to the network server 10.

Although only a single network client 12 is depicted in FIG. 1, it will be appreciated that in a preferred embodiment, there are many network clients 12 simultaneously connected to the network server 10. Each of the network clients 12 operates independently of each other, and is able to send and receive information to and from the network server 10. The network client 12 may be local or remote to the network server 10, but in the preferred embodiment, the network client 12 is remote to the network server 10.

Preferably, the network client 12 executes a network browser, such as Navigator™ from Netscape Communications Corporation or Internet Explorer™ from Microsoft Corporation, to interpret information that the client 12 receives from the network server 10. Also, the browser formats received information for presentation on a display device connected to the network client 12, such as a monitor or flat panel display.

To access information, the network client 12 sends a request for information from a requested information source 14 across the input lines 46 to the network server 10. The request from the network client 12 is received on lines 46 by the network server 10 with an input 18, and then sent along lines 50 to an interception means 22. The interception means 22 is connected to (lines 60) and controlled by logic 28, which contains several different functional modules. A communication monitoring means 32 monitors the activity of the interception means 22, looking for communications received by the interception means 22. When a communication is received by the interception means 22, such as a request sent from the network client 12, the communication monitoring means 32 of logic 28 detects that a request has been received.

The communication monitoring means 32 inspects the request from the network client 12 to determine whether the request is a request for requested information from requested information source 14 or a request for supplemental information from supplemental source 16. In the preferred embodiment, the communication monitoring means 32 makes this determination based on whether the request from the network client 12 includes a special tag. The significance of the tag, and whether or not it is present, is discussed in more detail below.

The request contains information that identifies it has having been generated by the network client 12. The logic 28 contains an identification means 34 that interprets the identification information in the request, and determines the identity of the network client 12 that generated the request. The identification means 34 also determines the identity of the requested information source 14 based on information received in the request from the network client 12. If the tag is not found in the request from the network client 12, then the interception means 22 sends the request to the transmission means 24 on lines 52. The transmission means 24 changes the address of the request into the proper form for routing to the requested information source 14, and passes the request on lines 58 to the output 20, which in turn sends the properly addressed request from the network server 10 to the requested information source 14 on output lines 48.

As mentioned above for the network client 12, there may be many requested information sources 14 connected to the network server 10. Although the requested information source 14 may be local or remote to the network server 10, in the preferred embodiment the requested information source 14 is remote to the network server 10.

As mentioned above, the diagram of FIG. 1 is functional, not physical. Thus, it will be appreciated that the network server 10, when viewed from the perspective as a unitary system, will have an input 18 and an output 20. However, in a physical embodiment, the input and output functions of the several systems that comprise the network server 10 may be physically separated into several dedicated devices, with each of the several devices handling a different portion of the input and output requirements of the overall network server 10 system. For example, as connected to the requested information source 14, the input lines 46 and the output lines 48 are preferably physically separate and distinct from the input lines 46 and output lines 48 that are connected to the network client 12. Also, the lines 46 and 48 connected to the requested information source 14 preferably represent Internet superstructure, rather than single user connections.

The requested information source 14 receives the request originating from the network client 12, and sends a reply back to the network server 10. The reply typically includes the requested information desired by the network client 12. The reply is received at input 18 and transferred to the interception means 22. The communication monitoring means 32 of the logic 28 detects the reply over lines 60, and the identification means 34 of the logic means 28 identifies the reply as having come from the requested information source 14. A first portion of the requested information, for example the initial packets in the stream of packets comprising the reply (typically consisting of the hypertext transfer protocol header) are stored in a memory 30 via lines 64.

In a preferred embodiment, the reply header is retrieved from memory 30 by the transmission means 22 (lines 64 and 60), which appends special format and request instructions (preferably containing the tag) to the reply header, then causes the modified reply to be sent to the network client 12 by output 20 across lines 48. To complete the response of the system to the request for the requested information, the second or remaining portion of the requested information is sent to the network client. In other words, in a preferred embodiment, the format and request instructions are inserted by the server "in-line" in the stream of data packets between the first and second portions of the requested information.

The format and request instructions are identified to the network client 12 as having originated with the requested information source that was identified from the initial request. Upon receipt at the network client 12, the format and request instructions preferably configure the network client 12 to present two distinct sets of information. The reply, modified to contain the format and request instructions, is presented by the network client 12 as one of the two distinct sets of information.

The identification means 34 identifies the reply to the network client 12 as having originated with the requested information source 14, and not with the network server 10, even though the network client 12 physically receives the reply from the network server 10, and not directly from the requested information source 14. Thus, it appears to the network client 12 as though it is directly connected to the requested information source 14, and the network server 10 remains, for the most part, functionally transparent to the network client 12.

The format and request instructions sent to the network client 12 also cause the network client 12 to request supplemental information from a supplemental information source 16. The request for supplemental information preferably contains the tag. In a preferred embodiment of the invention, the supplemental information source 16 is a collection of information that, although not specifically requested by the network client 12, would likely be of interest to the network client 12. The supplemental information may include advertisements of businesses that offer goods or services related in some way to the requested information. The supplemental information may also include news and weather reports, and other information that may not be directly related to the requested information.

The request for supplemental information generated by the format and request instructions contains information such as the identity of the network client 12 and the identity of the requested information source 14 (as determined by the identification means 34), which can be used by the supplemental information source 16 to delivery individualized and targeted supplemental information selected according to the identity of the network client 12 or associated with the requested information source 14.

Although the supplemental information source 16 may be local or remote to the network server 10, in the preferred embodiment it is remote. Further, as described above for the requested information source 14 and the network client 12, there may be many supplemental information sources 16 connected to the network server 10. The supplemental information source 16 could also be a component of the network server 10, such as a memory device connected to the logic 28. The supplemental information source 16 receives requests for supplemental information from the transmission means 24 through the output 20 and across the lines 48, and then sends the requested supplemental information on lines 46 through the input 18 to be received by the interception means 22.

When the interception means 22 receives the supplemental information from the supplemental information source 16 that is associated with the request for information from the network client 12, the transmission means 24 sends the associated supplemental information to the network client 12. The identification means 34 of the logic 28 identifies the supplemental information to the network client 12 as having originated with the requested information source 14, rather than as originating with the supplemental source 16, as described more completely below.

Figure 2:
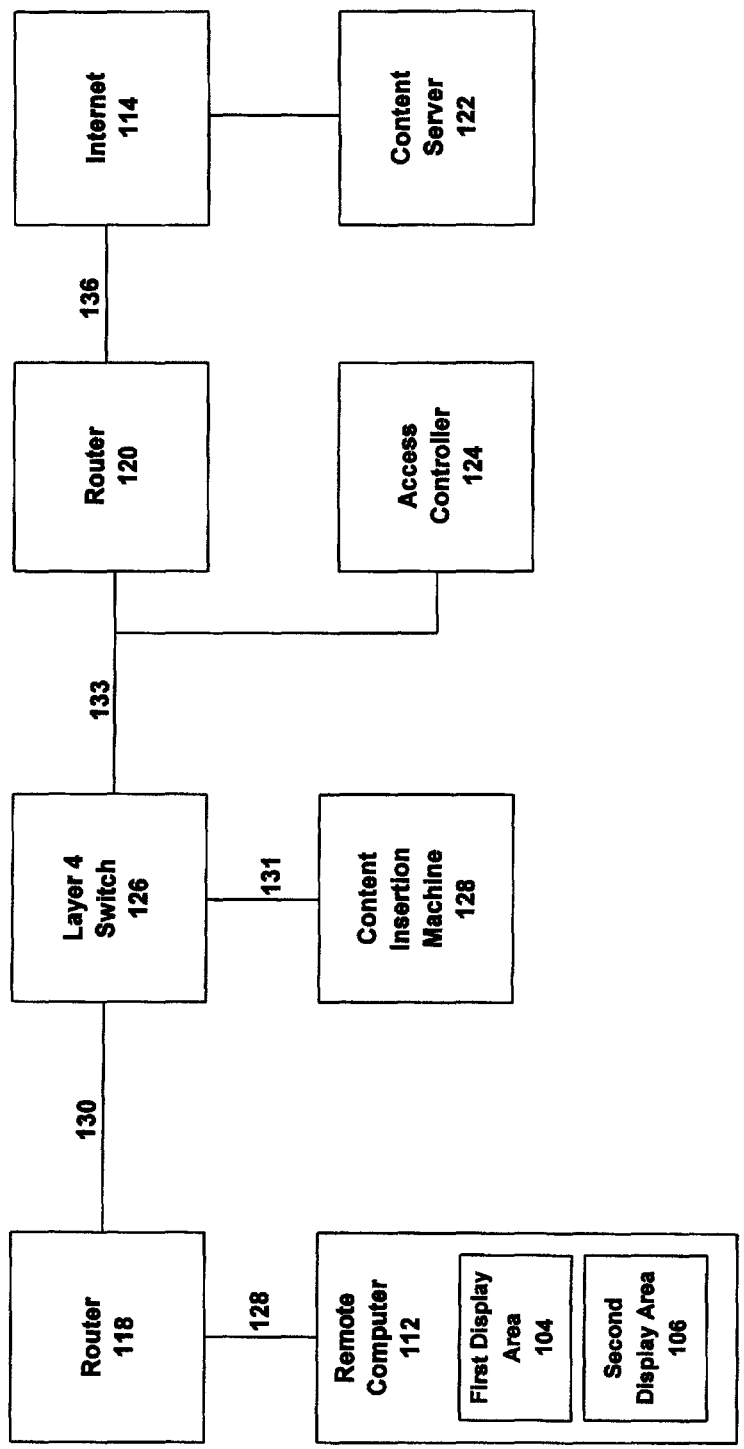
FIG. 2 is a hardware block diagram of one embodiment of the invention.

FIG. 2 provides a physical depiction of a system according to an embodiment of the present invention, the components of which include the functions as described above and depicted in FIG. 1. Dial in access from a remote computer 112 is provided over telephone lines 128. The remote computer 112 is preferably a standard PC class computer running a standard browser and related standard software. Communication is established between the remote computer 112 and the system with a router 118, such as a Universal Access Server model 5300 from Cisco Systems, Inc. All of the data input and data output between the remote computer 112 and the system is handled through the router 118. The remote computer represents the network client 12 depicted in FIG. 1.

An access controller 124, such as a PC running the Merit Network, Inc. freeware implementation of Remote Authentication Dial-In User Service (RADIUS) software under the Linux operating system, provides access authentication for the remote computers 112 that attempt to access the system, such as by username and password control to access of the system. Use of the system is monitored and controlled by the access controller 124.

In an alternate embodiment, the remote computer 112 is connected to LAN 130 by router 118 as a local node on the LAN 130. In this embodiment, the access controller 124 is not used to monitor and control access via username and password. Rather access is controlled by router 118 using the Internet protocol address of the remote computer 112.

Requests for information from the remote computer 112 are passed on LAN 130 to a Layer 4 switch 126, such as the Alteon ACEdirector 3 from Nortel Networks, which passes the requests for information on LAN 131 to a content insertion machine 128 running customized software under QNX to implement the request handling and code insertion described herein. The content insertion machine 128 passes the requests for requested information on LAN 131 back to the Layer 4 switch 126, which passes the request to the router 120, such as a model 2600 modular access router from Cisco Systems, Inc., on LAN 133. The router 120 routes the requests to the requested information source 14, preferably located on the global computer network 114 as depicted in FIG. 2. The supplemental information source 16 is provided by one or more content servers 122, preferably running Internet Information Server and SQLServer database server from Microsoft Corporation.

The content insertion machine 128 is the element that intercepts the requested information from the network 114, inserts special format and request instructions into the requested information, then passes the modified requested information to the remote computer 112 for display and processing. The content insertion machine 128 inspects all of the packets that are passed on LAN 131 by the Layer 4 switch 128, which includes packets from LAN 130 and LAN 133. Packets coming from the LAN 130 to the content insertion machine 128 are generally requests for requested information and supplemental information, and packets coming from the LAN 133 to the content insertion machine 128 are generally responses of requested information or of supplemental information.

Figure 3:
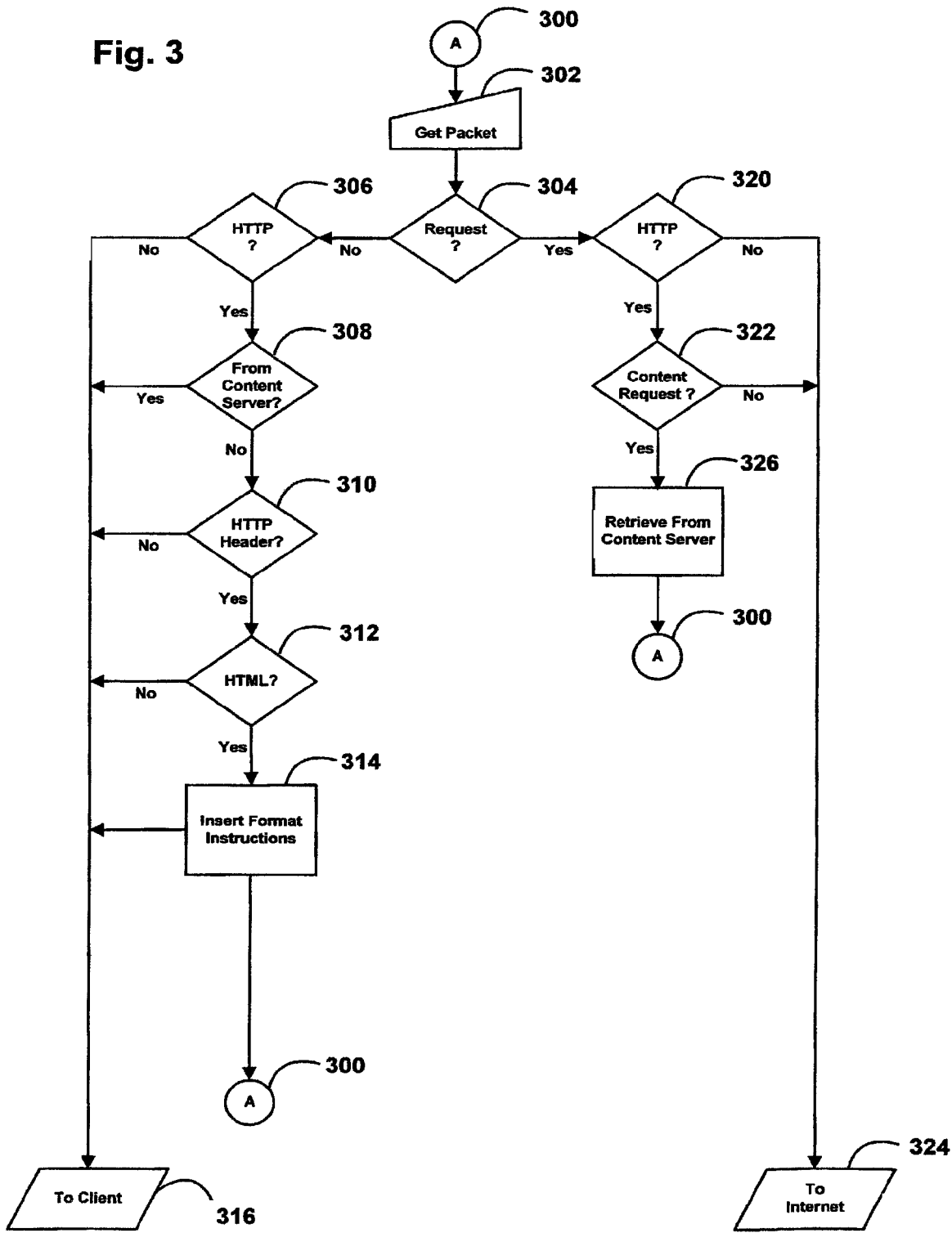
FIG. 3 is a flowchart illustrating the steps of one embodiment of the method of the invention.

Referring to the flow chart of FIG. 3, the content insertion machine 128 (FIG. 2) intercepts a packet in block 302, as depicted by the interception means 22 of FIG. 1, and inspects the packet to determine whether it is a request in block 304. If it is a request, such as that received on LAN 130 from the remote computer 112 of FIG. 2, then it is passed by the content insertion machine 128 to the decision block 320, where it is analyzed to determine if it is a hypertext transfer protocol (HTTP) request. If the request is not HTTP, but is some other protocol such as a simple mail transfer protocol (SMTP) or a file transfer protocol (FTP) request, then the content insertion machine 128 sends the request directly out on LAN 131 through the Layer 4 switch 126 to LAN 133 to the global computer network 114 to be retrieved in block 324.

If the request is HTTP, then it is further inspected to determine whether it is a request for supplemental information from the content server 122. In the preferred embodiment, this determination is made by the presence of a special tag in the request, as described previously. If it is such a request, then the content insertion machine 128 passes the request to block 326, where the request is processed by the content server 122 to appropriately associate and retrieve appropriate supplemental information. Control of the response from the content server 122 passes to connector A 300, for processing as a response packet in block 302, as discussed more completely hereafter.

If the packet does not contain a request for supplemental information, then the request packet is sent by the content insertion machine 128 to the global computer network 114 in block 324 to be retrieved from the requested information source. When the request is fulfilled by the network 114, it will be sent back to the content insertion machine 128 on LAN 133 and LAN 131 as a response, to be processed in block 302, as will be discussed below.

Looking again at block 302, the case in which the packet is not a request is now considered. As previously discussed, every packet passed through the content insertion machine 128 is intercepted by the interception means 22, and inspected to determine whether it constitutes a request or not. If it does not, control passes to decision block 306 and the packet is further inspected to determine whether it is an HTTP packet or some other type of data. If it is not an HTTP packet, then the content insertion machine 128 sends it out on LAN 131 and LAN 130 to the network client 12, depicted in FIG. 2 as the remote computer 112 (block 316 on FIG. 3). If the packet is an HTTP packet, then control is passed to decision block 308 and the packet is further inspected to determine whether it has originated with the content server 122. If the packet is supplemental information that has been requested by the format and request instructions in the remote computer 112, then it is sent directly at this point by the content insertion machine 128 to the network client 12 via LAN 131 and LAN 130.

If the packet is not supplemental information from the content server 122, then control passes to decision block 310, and the packet is further inspected to determine whether the packet contains an HTTP header. Typically, the information in the response will be more than will fit within a single packet, and the response will comprise a plurality of packets. Typically, only the first packet of a given response contains the HTTP header and is passed on to decision block 312, as discussed in more detail below, while the rest of the packets in the response, which do not contain the header, are sent directly to the network client 12 on LAN 131 and LAN 130 from decision block 310.

The initial packet of the response, which contains the HTTP header, is passed to decision block 312 to determine whether it is a hypertext markup language (HTML) packet or some other type of packet, such as an image packet, sound packet, video packet, executable code packet, or some other such. If it is not HTML, then the packet is sent directly to the network client 12 as described above.

If the packet is HTML, then control falls to block 314, and format and request instructions are appended to the HTTP header or other initial portion of the requested information and sent to the network client 12. The second or remaining portion of the requested information is then sent to the network client 12.

The format and request instructions sent to the network client 12 have been mentioned briefly above, and described using various terms. The format and request instructions perform at least two important functions. First, when they arrive at the network client 12, they inspect the environment to determine whether a special display format exists, such as an inline frame or layer within a browser or a specially named browser window. If the display format does exist, then the format and request instructions move on to their next function, as described below. If the display format does not exist, then the format and request instructions create the display format. The display format preferably consists of a dual display of information, such as a first display area 104 and a second display area 106 (FIG. 2). The intention is to load the requested information into the first display area 104 and the associated supplemental information into the second display area 106. In the case where the supplemental information is to be displayed in an inline frame or layer, the second display area 106 is the inline frame or layer, while the first display area 104, containing the requested information, is the remainder of the browser area excluding the inline frame or layer. In the case where the supplemental information is to be displayed in a separate browser window, the second display area 106 is the separate browser window, while the first display area 104 is the original browser window from which the request for requested information originated. In this case, the first display area 104 may be resized and repositioned by the format instructions, as necessary to accommodate the second display area 106 without overlapping of the two display areas.

If the display format exists, or after the format and request instructions have created the display format if it does not exist, the format and request instructions send the request for supplemental information. This request is processed by the content insertion machine 128 as described above and, in a preferred embodiment, also includes the tag. When the supplemental information arrives, which has been associated by the content server 122, it is loaded into the second display area 106 and presented concurrently with the requested information in the first display area 104.

The tag preferably contains various pieces of information. This information may include, but is not limited to, identification of the network client 12, a reference to the initial request, a reference to the requested information, and a unique token for control purposes and to further distinguish one tag from another.

After the format and request instructions containing the tag have been appended to the HTTP header and are sent to the network client from block 314, control then passes back to block 302 for the inspection of another packet of information. In a preferred embodiment of the invention, the format and request instructions comprise a script that can execute within the environment typically found on the network client 12, such as a Java script that can execute within one of the browsers mentioned above.

It will be appreciated that the invention as described above comprehends numerous adaptations, rearrangements, and substitutions of parts, all of which are considered to be within the scope and spirit of the invention as described, and that the scope of the invention is only to be restricted by the language of the claims given below.

What is claimed is:

1. An apparatus for accessing and providing information, comprising:

a database having stored therein (i) reconfigurable associations between supplemental information and requested information, wherein said supplemental information is stored in at least one supplemental information source, and wherein said requested information is stored in at least one requested information source and (ii) profiles of users based on information provided by the users, the profiles including information indicative of preferences and demographics of the users including any of educational level, occupation, income range, gender, age, hobbies, musical preferences, dietary preferences, religious preferences, activities, interests, pet ownership, and location;

an interface for receiving input from a user;

a processor programmed to receive the input from said interface, and in response to said input obtain requested information from one of said requested information sources and determine the identity of the particular user that sent the input;

said processor further programmed to access the database for information included in a profile of the particular user and to identify from said database at least one reconfigurable association between said requested information and supplemental information, the identification being based on at least information in the profile and the requested information;

said processor further programmed to obtain said supplemental information from one of said supplemental information sources, in response to said at least one reconfigurable association; and said processor still further programmed to prepare for delivery to a client device said supplemental information in conjunction with said requested information.

2. An apparatus as in claim 1 wherein the database includes advertiser preferences of a plurality of advertisers, the advertiser preferences indicating characteristics of users to whom to direct advertising.

3. An apparatus as in claim 2 wherein the supplemental information includes an advertisement from one of the plurality of advertisers.

4. An apparatus as in claim 3 wherein the identification is based on at least information in the profile of the particular user and the advertiser preferences.

5. A system for accessing and delivering information, the system comprising:

memory storing profiles of network clients based on information provided by the network clients, the profiles including information indicative of preferences and demographics of the network clients including any of educational level, occupation, income range, gender, age, hobbies, musical preferences, dietary preferences, religious preferences, activities, interests, pet ownership, and location, the memory further storing advertiser preferences of a plurality of advertisers, the advertiser preferences indicating characteristics of network clients to whom to direct advertising;

a network server configured to receive from a network client a request for information and configured to determine the identity of the particular network client that sent the request; and an association module configured to access the memory for information included in a profile of the particular network client, and configured to select an advertisement from a particular advertiser to be delivered to the particular network client in association with the requested information, wherein the association module selects the advertisement according to at least information in the profile, the requested content, and the advertiser preferences and is further configured to determine a category of information in which the particular network client is interested based on the profile, and further configured to access the advertiser preferences to determine a match between the category of information and characteristics of network clients of the particular advertiser.

6. A system as in claim 5 wherein the information indicative of preferences and demographics for the particular network client further includes records of information previously requested by the particular network client, and wherein the association module selects the advertisement according to at least the records and the advertiser preferences.

7. A system as in claim 6 wherein the association module modifies profiles based on a history of information requested by the network clients.

8. A system as in claim 5 further comprising updating the profiles of network clients periodically and updating the advertiser preferences periodically.

9. A system as in claim 5 wherein the advertiser preferences for a particular advertiser include characteristics of network clients that would likely be receptive to an advertisement from the particular advertiser.

10. A system as in claim 9 wherein the advertiser preferences for a particular advertiser include demographic information of network clients that would likely be receptive to an advertisement from the particular advertiser.

11. A method for accessing and delivering information via a computer system, the method comprising:
    storing a profile of a network client based on information provided by the network client, the profile including information indicative of preferences and demographics of the network client including any of educational level, occupation, income range, gender, age, hobbies, musical preferences, dietary preferences, religious preferences, activities, interests, pet ownership, and location;
    storing preferences of an advertiser, the preferences indicating characteristics of network clients to whom to direct advertising;
    receiving a request from the network client for content;
    accessing the information included in the profile of the network client and the preferences of the advertiser to select an advertisement from the advertiser to be delivered to the network client in association with the requested content based at least on information in the profile, the requested content, and the preferences of the advertiser; and
    modifying the profile of the network client based on a history of information requested by the network client.

12. A method as in claim 11 further comprising storing a record of information previously requested by the network client, wherein accessing the profile to select an advertisement to be delivered includes accessing the record of information previously requested and selecting an advertisement based at least on the record and the preferences of the advertiser.

13. A method as in claim 11 further comprising updating the profiles of network clients periodically and updating the preferences of the advertiser periodically.

14. A method as in claim 11 wherein the preferences of the advertiser include characteristics of network clients that would likely be receptive to an advertisement from the advertiser.

15. A method as in claim 14 wherein the preferences of the advertiser include demographic information of network clients that would likely be receptive to an advertisement from the advertiser.

16. A non-transitory computer readable medium having computer readable program codes embodied therein for accessing and delivering information, the computer readable medium program codes including instructions that, when executed by a processor, cause the processor to:
    store a profile of a network client based on information provided by the network client, the profile including information indicative of preferences and demographics of the network client including any of educational level, occupation, income range, gender, age, hobbies, musical preferences, dietary preferences, religious preferences, activities, interests, pet ownership, and location;
    store preferences of an advertiser, the preferences indicating characteristics of network clients to whom to direct advertising;
    following receipt of a request from the network client for content, access information included in the profile of the network client and the preferences of the advertiser to select an advertisement from the advertiser to be delivered to the network client in association with the requested content based at least on information in the profile, the requested content, and the preferences of the advertiser; and
    modify the profile of the network client based on a history of information requested by the network client.

17. A non-transitory computer readable as in claim 16 wherein the instructions further cause the processor to store a record of information previously requested by the network client and access the record when selecting an advertisement to be delivered.

18. A non-transitory computer readable as in claim 16 wherein the instructions further cause the processor to update the profiles of network clients periodically and update the preferences of the advertiser periodically.

19. A non-transitory computer readable as in claim 16 wherein the preferences of the advertiser include characteristics of network clients that would likely be receptive to an advertisement from the advertiser.

20. A non-transitory computer readable as in claim 19 wherein the preferences of the advertiser include demographic information of network clients that would likely be receptive to an advertisement from the advertiser.

21. A system for accessing and delivering information, the system comprising:
    memory storing profiles of network clients based on information provided by the network clients, the profiles including information indicative of preferences and demographics of the network clients including any of educational level, occupation, income range, gender, age, hobbies, musical preferences, dietary preferences, religious preferences, activities, interests, pet ownership, and location, the memory further storing advertiser preferences of a plurality of advertisers, the advertiser preferences indicating characteristics of network clients to whom to direct advertising;
    a network server configured to receive from a network client a request for information and configured to determine the identity of the particular network client that sent the request; and
    an association module configured to access the memory for information included in a profile of the particular network client, and configured to select an advertisement from a particular advertiser to be delivered to the particular network client in association with the requested information, wherein the association module selects the advertisement according to at least information in the profile, the requested content, and the advertiser preferences and further wherein the association module modifies profiles based on a history of information requested by the network clients.

22. A system as in claim 21 wherein the information indicative of preferences and demographics for the particular network client further includes records of information previously requested by the particular network client, and wherein the association module selects the advertisement according to at least the records and the advertiser preferences.

23. A system as in claim 21 wherein the association module is further configured to determine a category of information in which the particular network client is interested based on the profile, and further configured to access the advertiser preferences to determine a match between the category of information and characteristics of network clients of the particular advertiser.

24. A system as in claim 21 further comprising updating the profiles of network clients periodically and updating the advertiser preferences periodically.

25. A system as in claim 21 wherein the advertiser preferences for a particular advertiser include characteristics of network clients that would likely be receptive to an advertisement from the particular advertiser.

26. A system as in claim 25 wherein the advertiser preferences for a particular advertiser include demographic information of network clients that would likely be receptive to an advertisement from the particular advertiser.

27. An apparatus as in claim 1 wherein the supplemental information provided is based on the characteristics of the network client.

28. An apparatus as in claim 1 wherein the database includes advertiser preferences of a plurality of advertisers, the advertiser preferences indicating characteristics of network clients to whom to direct advertising.

29. An apparatus as in claim 28 wherein the advertiser preferences include characteristics of network clients to be excluded from direct advertising.

30. An apparatus as in claim 1 wherein the identification is further based on tags for controlling providing of the supplemental information.

31. A system as in claim 5 wherein the category of information includes any of images, video, audio, software code, or business information.

32. A system as in claim 5 wherein the characteristics of a network client includes an identity of the network client.

33. A system as in claim 5 wherein the association module is further configured to select the advertisement based on tags for controlling the selection of the advertisement.

34. A system as in claim 5 wherein the association module is further configured to select an advertisement based on characteristics of network clients to be excluded.

35. A method as in claim 11 wherein the information includes any of images, video, audio, software code, or business information.

36. A method as in claim 11 wherein the characteristics of a network client include an identity of the network client.

37. A method as in claim 11 wherein selection of the advertisement is based on tags for controlling the selection of the advertisement.

38. A method as in claim 11 wherein the preferences of the advertiser include characteristics of users to be excluded.

* * * * *

UNITED STATES PATENT AND TRADEMARK OFFICE
CERTIFICATE OF CORRECTION

PATENT NO. : 8,601,050 B2
APPLICATION NO. : 11/863105
DATED : December 3, 2013
INVENTOR(S) : Michael Carringer and Mark L. Schmid It is certified that error appears in the above-identified patent and that said Letters Patent is hereby corrected as shown below:

Title Page,

In the Inventors item (76) delete "Mark Schmid" and insert -- Mark L. Schmid --

Signed and Sealed this
Twenty-fifth Day of March, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,601,050 B2 | Page 1 of 1 |
| APPLICATION NO. | : 11/863105 | |
| DATED | : December 3, 2013 | |
| INVENTOR(S) | : Michael Carringer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1228 days.

Signed and Sealed this
Fourteenth Day of April, 2015

Michelle K. Lee
*Director of the United States Patent and Trademark Office*